United States Patent
Sakamoto et al.

(10) Patent No.: US 11,422,428 B2
(45) Date of Patent: Aug. 23, 2022

(54) LIGHT DEFLECTOR

(71) Applicant: Nippon Telegraph and Telephone Corporation, Tokyo (JP)

(72) Inventors: Takashi Sakamoto, Musashino (JP); Tadayuki Imai, Musashino (JP); Yuichi Akage, Musashino (JP); Masahiro Ueno, Musashino (JP); Sohan Kawamura, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 79 days.

(21) Appl. No.: 16/972,850

(22) PCT Filed: May 23, 2019

(86) PCT No.: PCT/JP2019/020462
§ 371 (c)(1),
(2) Date: Dec. 7, 2020

(87) PCT Pub. No.: WO2019/239840
PCT Pub. Date: Dec. 19, 2019

(65) Prior Publication Data
US 2021/0247660 A1 Aug. 12, 2021

(30) Foreign Application Priority Data
Jun. 13, 2018 (JP) .............. JP2018-113201

(51) Int. Cl.
G02F 1/29 (2006.01)
G02F 1/295 (2006.01)
G02F 1/313 (2006.01)

(52) U.S. Cl.
CPC ........... *G02F 1/29* (2013.01); *G02F 1/295* (2013.01); *G02F 1/3131* (2013.01)

(58) Field of Classification Search
None
See application file for complete search history.

(56) References Cited

U.S. PATENT DOCUMENTS
2017/0358899 A1  12/2017 Toyoda et al.

FOREIGN PATENT DOCUMENTS
JP  2014174279 A  *  9/2014
JP  61-93773 B2  8/2017
(Continued)

OTHER PUBLICATIONS

Shogo Yagi, et al., "A mechanical-free 150-kHz repetition swept light source incorporated a KTN electro-optic deflector," Proc. SPIE 7889, Optical Coherence Tomography and Coherence Domain Optical Methods in Biomedicine XV, 78891J (Feb. 11, 2011); https://doi.org/10.1117/12.876024 (Year: 2011).*

*Primary Examiner* — Ryan Crockett
(74) *Attorney, Agent, or Firm* — Workman Nydegger

(57) ABSTRACT

An optical deflector includes an electro-optical material in a paraelectric phase and having a trap for accumulating charges inside the electro-optical material; an electrode pair formed on facing surfaces of the electro-optical material; a first and second conductor hold units provided so as to hold the electro-optical material and the electrode pair therebetween; a temperature sensor that measures at least one of temperatures of the conductor hold units; and a temperature control unit that controls the temperatures of the conductor hold units, based on the measurement temperature, and the optical deflector sets an optical axis of incident light into the electro-optical material so as to be orthogonal to the electric field direction, applies between the electrode pair an alternating current voltage on which a direct current bias voltage is superimposed, and thereby deflects the incident light, in which the temperatures of the first and second conductor hold units are controlled so as to give the electro-optical (Continued)

material a temperature gradient to make a charge density in the electro-optical material substantially uniform.

15 Claims, 12 Drawing Sheets

(56) References Cited

FOREIGN PATENT DOCUMENTS

| | | |
|---|---|---|
| JP | 2017-203847 A | 11/2017 |
| JP | 2017-219732 A | 12/2017 |
| JP | 2018-13775 A | 1/2018 |

* cited by examiner

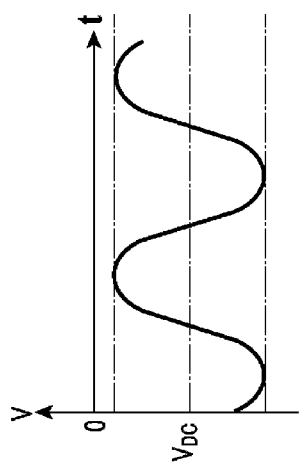
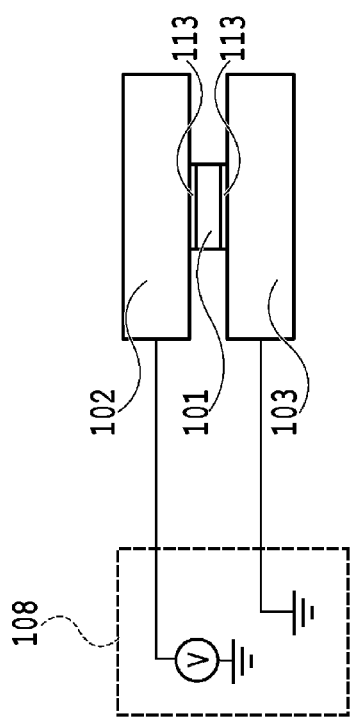
Fig. 7 (a)
Fig. 7 (b)

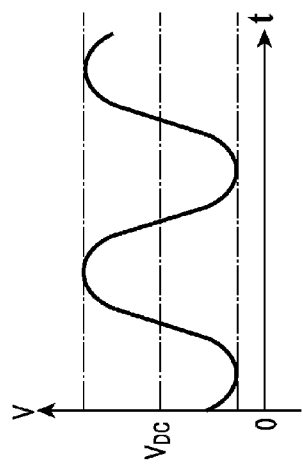
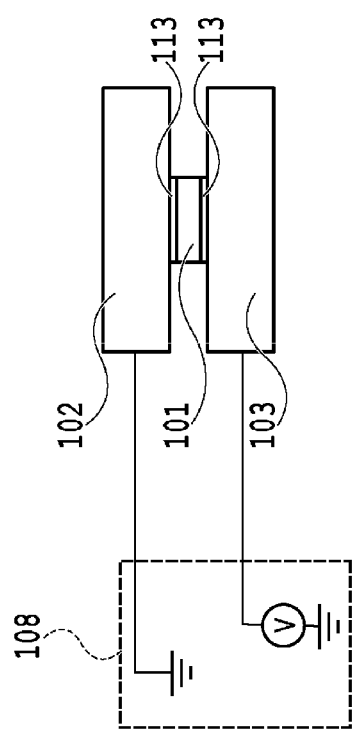
Fig. 8 (a)
Fig. 8 (b)

LIGHT DEFLECTOR

TECHNICAL FIELD

The present invention relates to an optical deflector using an electro-optical material.

BACKGROUND ART

An optical deflector that applies an alternating current voltage having a sine wave or the like to a dielectric (an electro-optical material) in a paraelectric phase to change the traveling direction of light is used in various fields such as laser printers and wavelength swept light sources. For example, Patent Literature 1 discloses a wavelength swept light source in which an electro-optical crystal in a paraelectric phase (a dielectric crystal in a paraelectric phase) is provided in an optical resonator, and the wavelength swept light source, when applying an AC voltage for high-speed deflection to the electro-optical crystal, superimposes a trap filling DC voltage as a bias voltage. Thus, the configuration disclosed in Patent Literature 1 can suppress variations in optical output, swept wavelength band, and coherence length over a long period of time, achieving a wavelength swept light source with excellent long-term stability.

Furthermore, Patent Literature 2 discloses that while light is emitted to an electro-optical crystal from a light emitter, an AC drive voltage on which a DC voltage is superimposed as a bias voltage is applied to the electro-optical crystal, enabling to shorten the time until electron injection into a trap reaches a steady state.

Here, as a material having a large electro-optical effect, KTN ($KTa_{1-x}Nb_xO_3$) or KLTN ($K_{1-y}Li_yTa_{1-x}Nb_xO_3$) is known (hereinafter collectively referred to as KTN). Furthermore, using a Ti or Cr material for an electrode can inject charges into the KTN. Using an internal electric field generated in the KTN by the injected charges can achieve a high-speed and wide-angle optical deflector.

FIG. 1 is a view showing a configuration of a conventional optical deflector using a KTN crystal, as viewed from the light incident direction (see, for example, Patent Literature 3). FIG. 1 shows a KTN crystal 11; aluminum nitrides (AlNs) 12a and 12b formed on respective both sides of the KTN crystal 11; metal blocks 13a and 13b formed so as to hold upper and lower surfaces of the KTN crystal 11 and upper and lower surfaces of the AlNs 12a and 12b sandwiched therebetween; a graphite sheet 14a inserted between the upper and lower surfaces of the KTN crystal 11 and the upper and lower surfaces of the AlNs 12a and 12b, and the metal block 13a; a graphite sheet 14b inserted between the upper and lower surfaces of the KTN crystal 11 and the upper and lower surfaces of the AlNs 12a and 12b, and the metal block 13b; a support plate 15; a Peltier element 16 disposed between the metal block 13a and the support plate 15; thermistors (temperature detectors) 17a and 17b respectively embedded inside the metal blocks 13a and 13b; a temperature control device 18; and an electrode pair 19.

The AlNs 12a and 12b are heat transfer materials for positioning the KTN crystal 11 and for keeping temperatures of the two metal blocks uniform.

On the upper and lower surfaces of the KTN crystal 11 facing each other, the electrode pair 19 including an anode and a cathode for receiving a control voltage is formed. The anode of the electrode pair 19 is electrically connected to a control voltage source (not shown) via the metal block 13a electrically in contact with the anode of the electrode pair 19, and the cathode of the electrode pair 19 is electrically connected to the control voltage source (not shown) via the metal block 13b electrically in contact with the cathode of the electrode pair 19. An electric field is generated inside the KTN crystal 11 by voltage application from the control voltage source and electron injection into the KTN crystal 11, enabling to generate a refractive index distribution inside the KTN crystal 11. An optical axis of incident light is set so as to be orthogonal to a direction of the electric field, and a voltage is applied between the electrode pair 19, enabling to deflect the incident light.

To prevent destruction of the KTN crystal due to vibration when a high frequency control voltage is applied to the KTN crystal 11 via the metal blocks 13a and 13b, the graphite sheet 14a is inserted between the upper and lower surfaces of the KTN crystal 11 and the upper and lower surfaces of the AlNs 12a and 12b, and the metal block 13a, and the graphite sheet 14b is inserted between the upper and lower surfaces of the KTN crystal 11 and the upper and lower surfaces of the AlNs 12a and 12b, and the metal block 13b.

The temperature control device 18 uses the thermistors 17a and 17b to detect temperatures of the metal blocks 13a and 13b and uses the Peltier element 16 to heat or cool each of the metal blocks 13a and 13b, maintaining the KTN crystal 11 at a suitable set temperature (a constant temperature). Specifically, the temperature control device 18 measures resistance values of the thermistors 17a and 17b connected in series to detect temperatures of the metal blocks 13a and 13b and controls feedback to keep a temperature of the KTN crystal 11 constant, enabling to keep a dielectric constant of the KTN crystal 11 constant.

CITATION LIST

Patent Literature

Patent Literature 1: Japanese Patent No. 6193773
Patent Literature 2: Japanese Patent Laid-Open No. 2017-219732
Patent Literature 3: Japanese Patent Laid-Open No. 2017-203847
Patent Literature 4: Japanese Patent Laid-Open No. 2018-13775

SUMMARY OF THE INVENTION

Technical Problem

As disclosed in Patent Literature 4, when a DC voltage is applied to an electro-optical crystal, and charges are injected into the crystal and trapped in the electro-optical crystal, a charge density generated by the trapped charges is not necessarily spatially uniform. The magnitude of the lens effect of the electro-optical crystal depends on the charge density, and accordingly when light passes through a different location in the electro-optical crystal, the magnitude of the lens experienced by the light typically differs.

On the other hand, when a light deflection phenomenon occurs, light passes through a different location in the electro-optical crystal. That is, in an optical deflector, the focal length differs depending on the instantaneous value of the drive voltage for performing optical deflection. This means that in an optical deflector, the magnitude of the lens effect changes depending on the instantaneous value of the drive voltage. Thus, a laser printer or the like has a problem in which the beam spot diameter is no longer uniform in the surface of the photoconductor, changing the exposure state. Furthermore, even if the lens is disposed in series with the optical deflector, deflected light cannot always be kept parallel in one cycle of the deflection operation.

As disclosed in Patent Literature 1, to improve wavelength selectivity in a laser resonator, parallel light is desirably incident on the diffraction grating. However, the light may or may not be parallel depending on the instantaneous voltage, and accordingly good wavelength selectivity cannot be obtained over the entire oscillation wavelength region.

The present invention has been made in view of a problem in which when an alternating current voltage on which a direct current bias voltage is superimposed is applied to an electro-optical material, the resulting lens effect has dependence on an instantaneous value of the drive voltage, and an object of the present invention is to provide an optical deflector having a suppressed dependence of such a lens effect on the instantaneous value of the drive voltage.

Means for Solving the Problem

An optical deflector according to one aspect of the present invention includes an electro-optical material in a paraelectric phase and having a trap for accumulating charges inside the electro-optical material; an electrode pair formed on surfaces of the electro-optical material facing each other, in which the electrode pair includes a cathode and an anode that generate an electric field inside the electro-optical material; a first conductor hold unit and a second conductor hold unit provided so as to hold the electro-optical material and the electrode pair therebetween; a temperature sensor that measures at least one of temperatures of the first conductor hold unit and the second conductor hold unit; and a temperature control unit that controls each of the temperatures of the first conductor hold unit and the second conductor hold unit, based on the temperature measured in the temperature sensor, and the optical deflector sets an optical axis of incident light into the electro-optical material so as to be orthogonal to a direction of the electric field, applies between the electrode pair an alternating current voltage on which a direct current bias voltage is superimposed, and thereby deflects the incident light, in which the temperature control unit controls the temperatures of the first conductor hold unit and the second conductor hold unit so as to give the electro-optical material a temperature gradient to make a charge density in the electro-optical material substantially uniform.

Effects of the Invention

According to the optical deflector according to one aspect of the present invention, there is provided the optical deflector including the electro-optical material to which the alternating current voltage on which the direct current bias voltage is superimposed is applied, enabling to achieve an optical deflector having an electro-optical material whose lens effect does not greatly depend on an instantaneous value of the drive voltage.

BRIEF DESCRIPTION OF DRAWINGS

FIGS. 7(a) and 7(b) are views respectively showing a configuration example and applied voltage of a power supply 108 in the optical deflector 100 according to the first embodiment of the present invention.

FIGS. 8(a) and 8(b) are views respectively showing a configuration example and applied voltage of the power supply 108 in the optical deflector 100 according to the first embodiment of the present invention.

DESCRIPTION OF EMBODIMENTS

Figure 1:
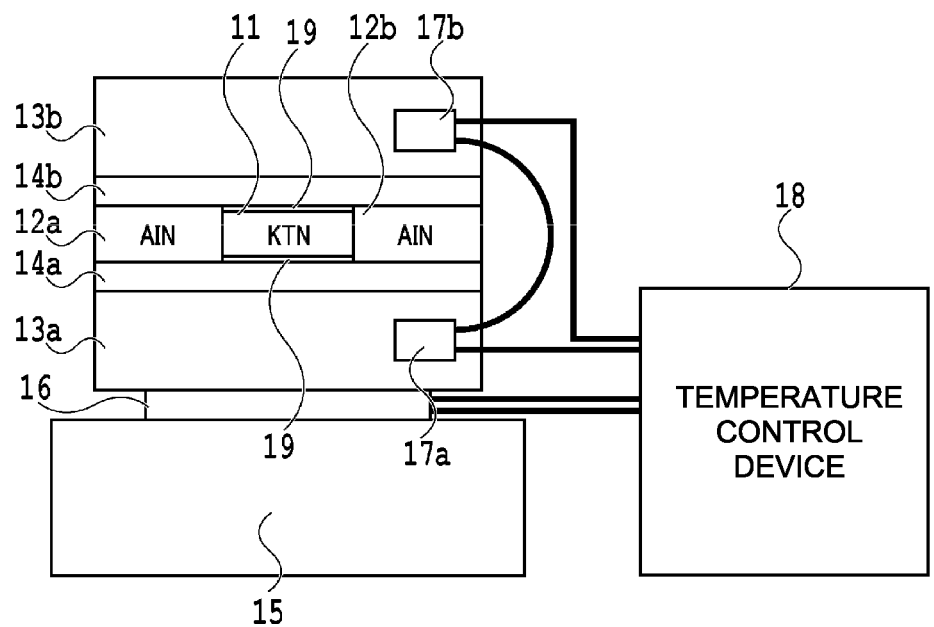
FIG. 1 is a view showing a configuration of a conventional optical deflector using a KTN crystal.

Operation Principle of Optical Deflector According to One Aspect of the Present Invention First, an operation principle of an optical deflector according to one aspect of the present invention, which is used for making charges in an electro-optical material uniform, will be described. As disclosed in Patent Literature 1, assuming that charges are uniformly trapped in the electro-optical material, a focal length f by a lens effect that develops at the same time as a light deflection phenomenon is represented by Formula 1 below.

Expression 1

$$f = \frac{1}{n_0 \sqrt{A} \sin(L\sqrt{A})} \quad \text{(Formula 1)}$$

Here, in Formula 1 above, A is represented by Formula 2 below.

Expression 2

$$A = n_0^2 g_{11} \rho^2 \quad \text{(Formula 2)}$$

Here, $n_0$ is a refractive index of the electro-optical material to which no voltage is applied, L is a length of the electro-optical material in the optical axis direction of incident light, $g_{11}$ is an electro-optical coefficient of the electro-optical material, and ρ is a charge density in the electro-optical material. L, $n_0$, and $g_{11}$ are unchanged in the already formed electro-optical material, and accordingly when ρ is a constant, A is also a constant by Formula 2, and the focal length f is also constant by Formula 1 regardless of the instantaneous voltage. Note that the reciprocal of the focal length f is called lens power. That is, the shorter the focal length f, the larger the lens power.

However, as described above, when an AC voltage on which a DC bias is superimposed is applied, a charge distribution in the electro-optical material is not necessarily uniform. As disclosed in Patent Literature 4, the difference between the charge density in the vicinity of the cathode and the charge density in the vicinity of the anode is considered as the cause of generating instantaneous voltage dependence of the lens power.

Note that when charges are electrons, the sign of the charge density is negative. Thus, when the magnitude of the charge density is discussed, using a term "absolute value of charge density" is less likely to cause misunderstanding. However, to avoid complexity of description, "large/small charge density" will be hereinafter used to mean "large/small absolute value of charge density." For example, when the charge density in the vicinity of the cathode is $-70$ C/m$^3$ and the charge density in the vicinity of the anode is $-60$ C/m$^3$, the charge density in the vicinity of the cathode is described as large. Note that when the charge density itself, not the magnitude of the charge density, is discussed, it is considered including the sign as it is in a normal manner.

Next, a method for reducing the charge density in the vicinity of the cathode will be considered. According to Gauss's law, a relationship shown in Formula 3 below holds.

$$\text{div } D = \text{div}(\varepsilon E) = \rho \quad \text{(Formula 3)}$$

Here, D is an electric flux density vector, E is an electric field vector, ε is a dielectric constant, and ρ is a charge density. Assuming that D and E have only an x component and depend only on an x direction, a relationship shown in Formula 4 below holds from Formula 3.

Expression 3

$$\frac{\partial}{\partial x}(\varepsilon E) = \frac{\partial \varepsilon}{\partial x} E + \varepsilon \frac{\partial E}{\partial x} = \rho \quad \text{(Formula 4)}$$

In Formula 4, if the dielectric constant does not depend on x or if the first term is smaller than the second term and negligible, a relationship shown in Formula 5 below holds from Formula 4.

Expression 4

$$\varepsilon \frac{\partial E}{\partial x} = \rho \quad \text{(Formula 5)}$$

Formula 5 means a suggestion that when the charge density in the vicinity of the cathode is larger than that in the vicinity of the anode, if the dielectric constant in the vicinity of the cathode can be made smaller than that in the vicinity of the anode, the charge density in the vicinity of the cathode can be reduced and can be made closer to the charge density in the vicinity of the anode.

However, if the dielectric constant is provided with location dependence in such a manner, $\partial \varepsilon / \partial x \neq 0$ holds. Thus, in order for the above described discussion to be a correct inference, in the vicinity of the cathode, the first term of Formula 4 needs to be sufficiently smaller than the second term. Whether the condition is satisfied will be considered below.

When the charge density ρ is spatially uniform, assuming that V is an instantaneous value of the drive voltage, and d is a thickness of the electro-optical crystal (distance between the electrodes), the electric field E in the electro-optical material is represented by Formula 6 below.

Expression 5

$$E = \frac{\rho}{\varepsilon}\left(x - \frac{d}{2} + \frac{\varepsilon V}{\rho d}\right) \quad \text{(Formula 6)}$$

Figure 2:
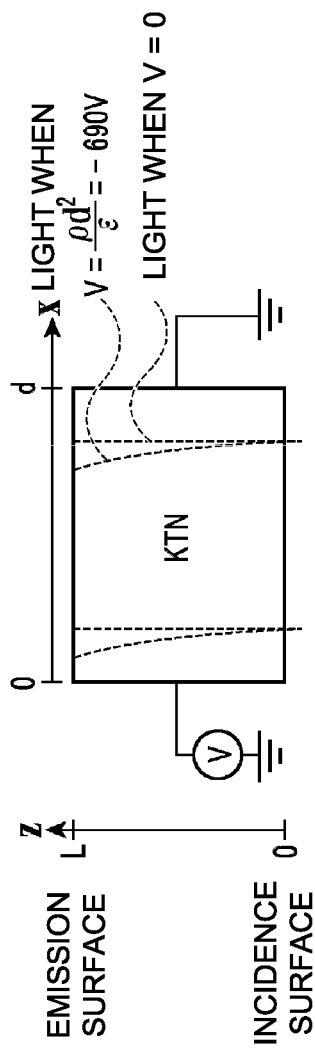
FIG. 2(a) is a view showing a state where light deflects in a KTN crystal.
FIG. 2(b) is a view showing spatial dependence of an electric field E in the KTN crystal.
Figure 2:
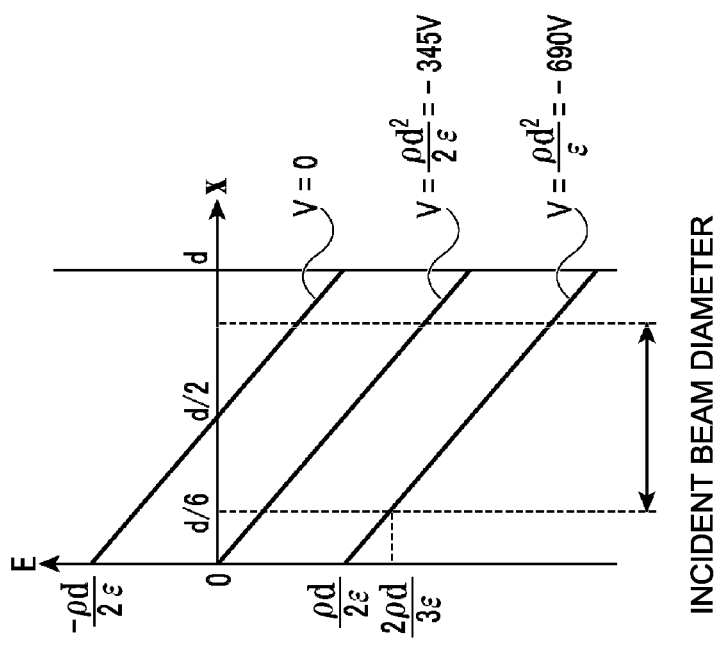

FIG. 2(a) shows a state where light deflects in a KTN crystal. Furthermore, FIG. 2(b) shows spatial dependence of the electric field E in the KTN crystal. In FIGS. 2(a) and 2(b), x=0 corresponds to a position of the cathode, and x=d corresponds to a position of the anode. A case where the charge density ρ is negative is considered, and accordingly a slope of the electric field E is negative as shown in FIG. 2(b).

As shown in FIG. 2(a), when V=0, the light goes straight through the KTN crystal, while when V=ρd$^2$/ε, the light bends in a −x direction. When V=0, the electric field E is represented by Formula 7 below from Formula 6 above.

Expression 6

$$E = \frac{\rho}{\varepsilon}\left(x - \frac{d}{2}\right) \quad \text{(Formula 7)}$$

When an instantaneous value V of the drive voltage is represented by Formula 8 below, the electric field E=0 holds at x=0 from Formula 6 above, as shown in FIG. 2(b).

Expression 7

$$V = \frac{\rho d^2}{2\varepsilon} \quad \text{(Formula 8)}$$

In an optical deflector using a KTN crystal, the dielectric constant of the KTN crystal is provided with location dependence (gradient), and the dielectric constant of the anode is set to 17500 $\varepsilon_0$; the dielectric constant of the cathode, 15500 $\varepsilon_0$ ($\varepsilon_0$ is a vacuum dielectric constant). When the average value 16500 $\varepsilon_0$ is adopted as a dielectric constant ε of the KTN crystal, and typical values ρ=−70 C/m$^3$ and d=1.2 mm are substituted, V=−345 V holds in Formula 8 above. That is, for example, when the DC bias is set to −345 V, and an AC voltage is superimposed thereon, the instantaneous value V of the drive voltage when the AC voltage is 0 corresponds to this voltage. Assuming that an amplitude of the AC voltage is 345 V, the instantaneous value V of the drive voltage takes a value of 0 to −690 V.

When a typical value of 0.8 mm=2d/3 is adopted as a diameter of the incident beam, and an optical axis of the incident beam is set to x=d/2, a position of the end of the beam on the cathode side is approximately x=d/6 as shown in FIG. 2(b). When V=$\rho d^2/\varepsilon$, the electric field at x=d/6 is E=2$\rho d/(3\varepsilon)$ as shown in FIG. 2(b). At this time, when the dielectric constant at x=d/6 is approximately $\varepsilon$=16000 $\varepsilon_0$, a magnitude of the electric field at x=d/6 is |E|=|2$\rho d/(3\varepsilon)$| =383×10$^3$ V/m.

As described above, assuming that the dielectric constant of the anode is 17500 $\varepsilon_0$, and the dielectric constant of the cathode is 15500 $\varepsilon_0$, if the dielectric constant $\varepsilon$ changes linearly with respect to the position x, |$\partial\varepsilon/\partial x$|=1.48×10$^{-5}$ C/(Vm$^2$) holds. From the above, the absolute value of the first term of Formula 4 is |$\partial\varepsilon/\partial x$| |E|=5.67 C/m$^3$. On the other hand, the absolute value of the second term of Formula 4 is $\varepsilon$|$\partial E/\partial x$|=$\varepsilon$|$\rho/\varepsilon$|=|$\rho$|=70 C/m$^3$.

From the above evaluation, in Formula 4, the second term is shown to be sufficiently larger than the first term in the vicinity of the cathode. This shows that Formula 5 can be considered to approximately hold. Therefore, it is certainly suggested that if the charge density in the vicinity of the cathode is larger than that in the vicinity of the anode, when the dielectric constant in the vicinity of the cathode can be made smaller than that in the vicinity of the anode, the charge density in the vicinity of the cathode can be reduced and can be made closer to the charge density in the vicinity of the anode.

Figure 3:
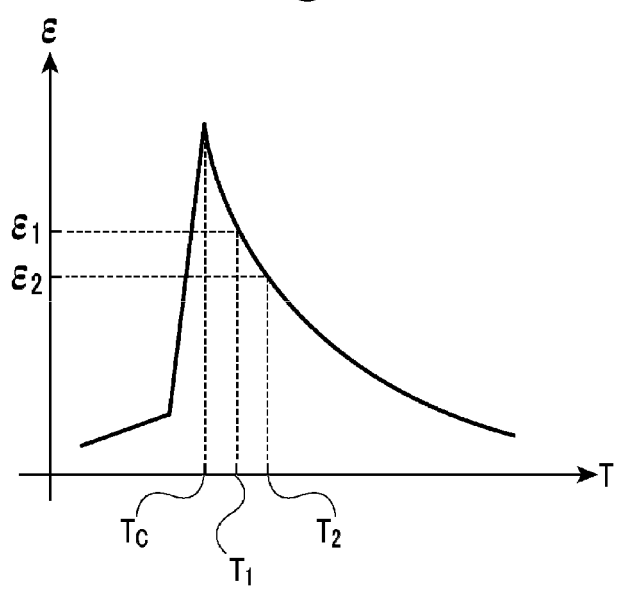
FIG. 3 is a view showing temperature dependence of a dielectric constant of the KTN crystal.

Next, a method for providing a slope of the dielectric constant will be considered. FIG. 3 is a view showing temperature dependence of the dielectric constant of the KTN crystal. The KTN crystal undergoes a structural phase transition at a phase transition temperature and takes a tetragonal crystal (ferroelectric) at a low temperature and a cubic crystal (paraelectric) at a high temperature. As shown in FIG. 3, in the cubic crystal (paraelectric), the dielectric constant takes a peak value at a phase transition temperature $T_c$, and as the temperature rises therefrom, the dielectric constant becomes smaller. Thus, the temperature can be increased ($T_2$ in FIG. 3) to reduce the dielectric constant ($\varepsilon_2$ in FIG. 3), and the temperature can be decreased ($T_1$ in FIG. 3) to increase the dielectric constant ($\varepsilon_1$ in FIG. 3). That is, when the temperature on the cathode side is made higher than that on the anode side, the dielectric constant on the cathode side can be reduced.

Measurement System for Evaluating Characteristic of Optical Deflector

Figure 4:
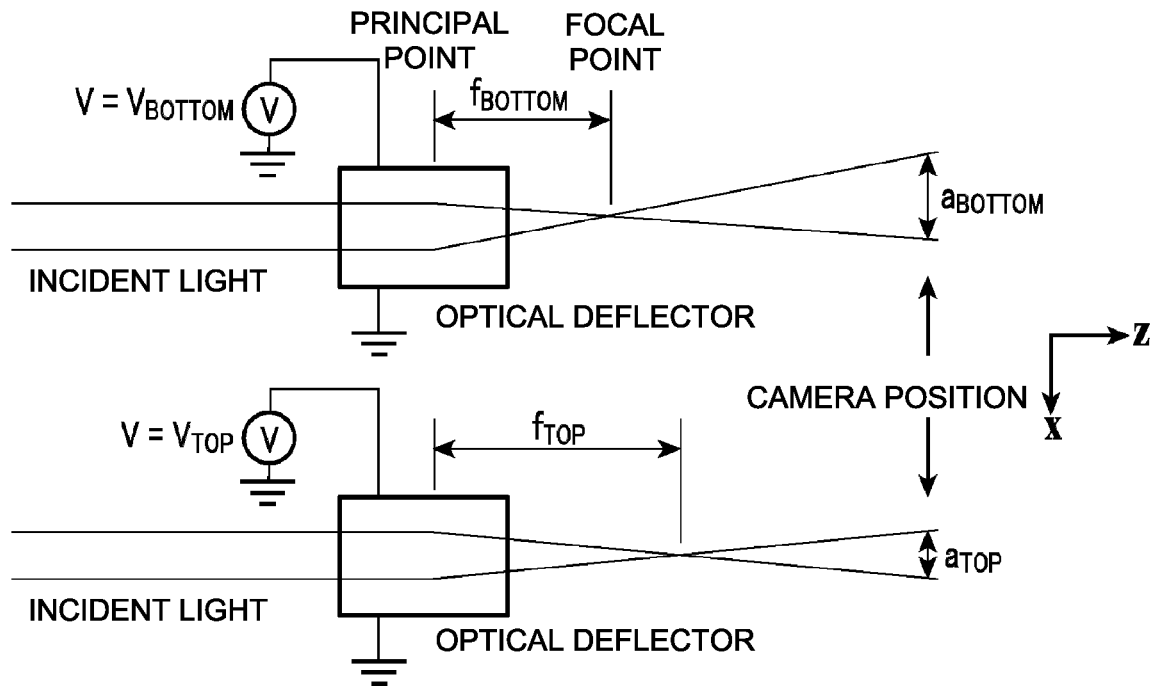
FIGS. 4(a) and 4(b) are views respectively showing a measurement system and an applied voltage thereof for evaluating a characteristic of an optical deflector.
Figure 4:
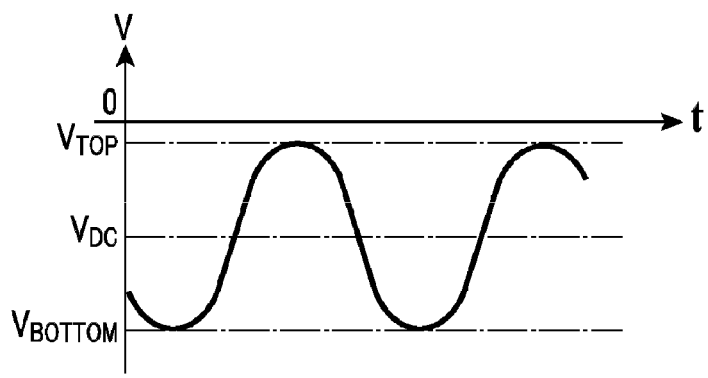

FIGS. 4(a) and 4(b) respectively show a measurement system and an applied voltage thereof for evaluating a characteristic of an optical deflector. As shown in FIG. 4(a), a camera is disposed at a position away from the optical deflector at a certain distance, collimated light is input to the optical deflector, and a beam profile of a transmitted light is observed. FIG. 4(a) also shows a state of light beam propagation when the instantaneous voltage is at $V_{BOTTOM}$ and $V_{TOP}$. A focal length of the electro-optical material when the instantaneous voltage is at $V_{BOTTOM}$ is $f_{BOTTOM}$, a beam diameter at the camera position when the instantaneous voltage is at $V_{BOTTOM}$ is $a_{BOTTOM}$, a focal length of the electro-optical material when the instantaneous voltage is at $V_{TOP}$ is $f_{TOP}$, and a beam diameter at the camera position when the instantaneous voltage is at $V_{TOP}$ is $a_{TOP}$. FIG. 4(a) shows a case where $f_{BOTTOM} < f_{TOP}$ holds.

As can be seen from FIG. 4(a), if light is focused and then received by the camera, when $f_{BOTTOM} < f_{TOP}$ holds, $a_{BOTTOM} > a_{TOP}$ holds, when $f_{BOTTOM} = f_{TOP}$ holds, $a_{BOTTOM} = a_{TOP}$ holds, and when $f_{BOTTOM} > f_{TOP}$ holds, $a_{BOTTOM} < a_{TOP}$ holds.

Figure 5:
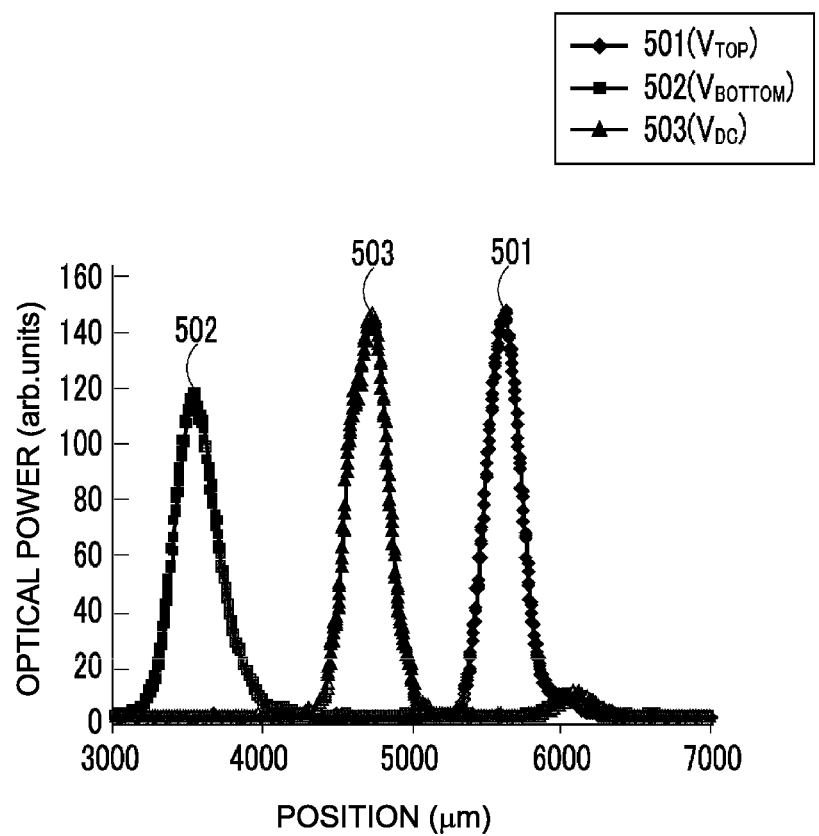
FIG. 5 is a view showing an evaluation result of position dependence of light intensity in the deflection direction in the conventional optical deflector.

Here, FIG. 5 shows an evaluation result of position dependence of light intensity in the deflection direction in a conventional optical deflector. As the conventional optical deflector, an optical deflector shown in FIG. 1 is used in which a part of an AlN 12b has a hole, and through the hole, LED light having a peak wavelength of 405 nm can be emitted from the outside. As an electro-optical material, a KTN crystal having a rectangular parallelepiped shape and a size of 4.0×3.2×2.0 mm$^3$ is used. An electrode film made of Ti/Pt/Au is vapor-deposited on a surface of 4.0×3.2 mm$^2$. A temperature is determined so that a relative dielectric constant of the electro-optical material is 17500 in the cubic crystal (paraelectric phase).

When a DC bias of −300 V, an amplitude of 225 V, and a sine wave voltage having a frequency of 1 kHz are applied while the LED light having a peak wavelength of 405 nm is emitted, a full deflection angle of incident light having a wavelength of 1.06 μm is 18.9 mrad. In FIG. 5, a camera is disposed at a position away from a KTN emission end surface at a distance of 107.5 mm to measure a beam profile 501 at $V_{TOP}$ at which the instantaneous value of the voltage itself is maximum, a beam profile 502 at a voltage $V_{BOTTOM}$ at which the absolute value of the instantaneous value of the voltage is maximum, and a beam profile 503 at an intermediate voltage $V_{DC}$.

As shown in FIG. 5, in the conventional optical deflector, a beam diameter (radius) that is a distance from a position of the center of gravity of the beam where the light intensity is maximum to a position where the light intensity is 1/e$^2$ times the light intensity of the center of gravity of the beam is 237 μm at $V_{TOP}$, 300 μm at $V_{BOTTOM}$, and 270 μm at $V_{DC}$, and the beam diameter varies by about 25%. Accordingly, it is understood that in the conventional optical deflector, the beam diameter greatly depends on the instantaneous value of the drive voltage.

Method for Determining Temperature Gradient

The evaluation system shown in FIG. 4(a) is used to evaluate the beam diameter at various instantaneous values of the drive voltage under a condition that various temperature gradients are given to the electro-optical material. From the evaluation results, a temperature gradient condition can be selected so that instantaneous voltage dependence of the beam diameter is reduced.

First Embodiment

Figure 6:
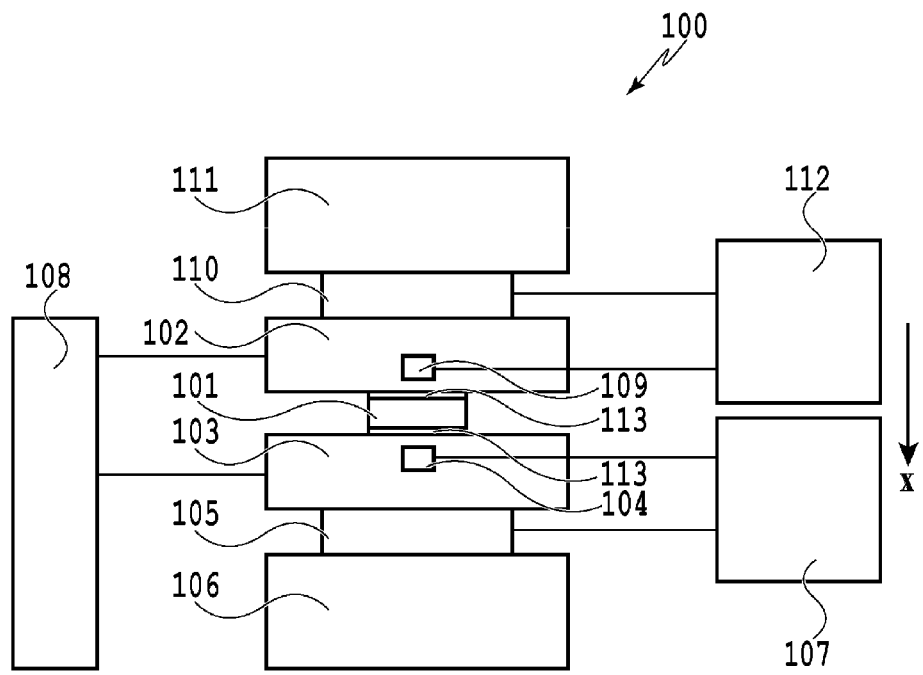
FIG. 6 is a view exemplifying a configuration of an optical deflector 100 according to the first embodiment of the present invention.

Based on the consideration above, a configuration of an optical deflector according to the first embodiment of the present invention will be explained. FIG. 6 is a view exemplifying a configuration of an optical deflector 100 according to the first embodiment of the present invention, as viewed from the light incident direction. As shown in FIG. 6, in the optical deflector 100 according to the first embodiment of the present invention, an electro-optical material 101 is provided between a cathode side metal block 102 and an anode side metal block 103 so as to be held between the cathode side metal block 102 and the anode side metal block 103. The electro-optical material 101 is in a paraelectric phase and has a trap for accumulating charges inside the electro-optical material 101. The electro-optical material 101 can be a KTN (KTa$_{1-x}$Nb$_x$O$_3$) crystal or a lithium-added KLTN (K$_{1-y}$Li$_y$Ta$_{1-x}$Nb$_x$O$_3$) crystal, where 0<x<1 and 0<y<1.

On upper and lower surfaces of the electro-optical material 101 facing each other, an electrode pair 113 including a cathode and an anode for receiving a control voltage is formed. Furthermore, the cathode side metal block 102 and the anode side metal block 103 are provided so as to hold the electro-optical material 101 and the electrode pair 113 therebetween. The cathode of the electrode pair 113 is electrically connected to a power supply 108 via the cathode side metal block 102, and the anode of the electrode pair 113 is electrically connected to the power supply 108 via the anode side metal block 103. The power supply 108 superimposes a direct current bias voltage $V_{DC}$ while applying an alternating current voltage to the electrode pair 113 via the cathode side metal block 102 and the anode side metal block 103.

An electric field is generated inside the electro-optical material 101 by voltage application from the control voltage source via the cathode side metal block 102 and the anode side metal block 103 respectively in contact with the cathode and anode of the electrode pair 113 and electron injection into the electro-optical material 101, enabling to generate a refractive index distribution inside the electro-optical material 101. An optical axis of incident light into the electro-optical material 101 is set so as to be orthogonal to a direction of the electric field, and an alternating current voltage on which the direct current bias voltage is superimposed is applied between the electrode pair 113, enabling to deflect the incident light.

The cathode side metal block 102 has a temperature sensor 109 and a Peltier element 110 attached thereto. The Peltier element 110 has a heat sink 111 attached thereto. Similarly, the anode side metal block 103 has a temperature sensor 104 and a Peltier element 105 attached thereto. The Peltier element 105 has a heat sink 106 attached thereto. The temperature sensor 104 and the Peltier element 105 are connected to a Peltier controller 107. Similarly, the temperature sensor 109 and the Peltier element 110 are connected to a Peltier controller 112. The Peltier elements 105 and 110 and the Peltier controllers 107 and 112 constitute a temperature control unit.

The temperature sensor 104 attached to the anode side metal block 103 measures a temperature of the anode side metal block 103. Based on the temperature measured in the temperature sensor 104, the Peltier controller 107 performs control to keep the temperature of the anode side metal block 103 at a predetermined set temperature. Specifically, based on the temperature measured in the temperature sensor 104, the Peltier controller 107 adjusts a current to flow to the Peltier element 105 and performs temperature control of the anode side metal block 103. As a result, a temperature of the electro-optical material 101 is affected by the temperature control.

Similarly, the temperature sensor 109 attached to the cathode side metal block 102 measures a temperature of the cathode side metal block 102. Based on the temperature measured in the temperature sensor 109, the Peltier controller 112 performs control to keep the temperature of the cathode side metal block 102 at a predetermined set temperature. Specifically, based on the temperature measured in the temperature sensor 109, the Peltier controller 112 adjusts a current to flow to the Peltier element 110 and performs temperature control of the cathode side metal block 102. As a result, a temperature of the electro-optical material 101 is affected by the temperature control.

The Peltier controller 107, via the Peltier element 105, controls the temperature of the anode side metal block 103 so as to give the electro-optical material 101 a temperature gradient to make the charge density in the electro-optical material 101 substantially uniform. The Peltier controller 112, via the Peltier element 110, controls the temperature of the cathode side metal block 102 so as to give the electro-optical material 101 a temperature gradient to make the charge density in the electro-optical material 101 substantially uniform.

FIGS. 7(a) and 7(b) respectively show, when the anode side metal block 103 is connected to ground, a configuration example and applied voltage of the power supply 108 in the optical deflector 100 according to the first embodiment of the present invention. As shown in FIG. 7(a), the cathode side metal block 102 is connected to an alternating current power supply, and the anode side metal block 103 is connected to ground.

When the anode side metal block 103 is connected to ground, in order for the anode side metal block 103 to be an anode and the cathode side metal block 102 to be a cathode, the power supply 108 applies a voltage where the direct current bias voltage $V_{DC}$ is negative, as shown in FIG. 7(b).

FIGS. 8(a) and 8(b) respectively show, when the cathode side metal block 102 is connected to ground, a configuration example and applied voltage of the power supply 108 in the optical deflector 100 according to the first embodiment of the present invention. As shown in FIG. 8(a), the cathode side metal block 102 is connected to ground, and the anode side metal block 103 is connected to an alternating current power supply.

When the cathode side metal block 102 is connected to ground, in order for the anode side metal block 103 to be an anode and the cathode side metal block 102 to be a cathode, the power supply 108 applies a voltage where the direct current bias voltage $V_{DC}$ is positive, as shown in FIG. 8(b).

In either case where the cathode side metal block 102 is connected to ground or where the anode side metal block 103 is connected to ground, no difference occurs in the following discussion. Accordingly, for example purposes, the case where the anode side metal block 103 is configured to be connected to ground as shown in FIG. 7(a) will be hereinafter considered.

Figure 9:
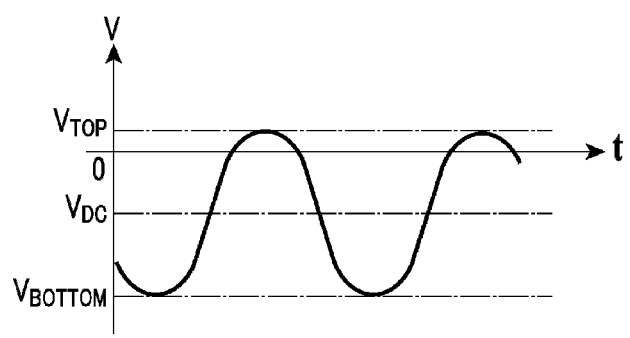
FIG. 9 is a view showing, when an alternating current voltage has a large amplitude, an applied voltage of the power supply 108 in the optical deflector 100 according to the first embodiment of the present invention.

Note that when the alternating current voltage has a large amplitude, a situation shown in FIG. 9 may occur. FIG. 9 shows, when the alternating current voltage has a large amplitude, an applied voltage of the power supply 108 in the optical deflector 100 according to the first embodiment of the present invention.

Assuming that an instantaneous voltage when the absolute value thereof is largest is $V_{BOTTOM}$, and an instantaneous voltage when the instantaneous voltage, not the absolute value thereof, is largest, is $V_{TOP}$, as shown in FIG. 9, in the vicinity of $V=V_{TOP}$, a time zone where the sign of the instantaneous voltage is inverted and becomes positive may occur, and a time zone where the cathode side metal block 102 is an anode and the anode side metal block 103 is a cathode may occur. However, such a time zone is limited to a short time, and accordingly the cathode side metal block 102 is referred to as the cathode side metal block 102, and the anode side metal block 103 is referred to as the anode side metal block 103, regardless of the presence or absence of such inversion of the sign.

Here, when the cathode side metal block 102 and the anode side metal block 103 are set to different temperatures, the electro-optical material 101 has a temperature distribution (slope) in an x direction in FIG. 6 (a direction parallel or antiparallel to a direction of a generated electric field when a voltage is applied).

Figure 10:
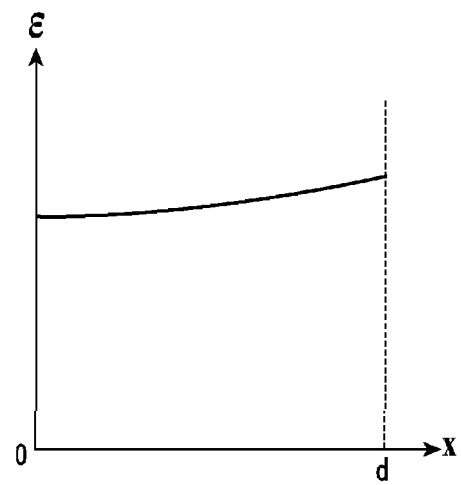
FIGS. 10(a) and 10(b) are views respectively showing a dielectric constant ε and spatial dependence (x dependence) of a temperature T when a KTN crystal in a paraelectric phase is used as an electro-optical material, and a temperature of a cathode is made higher than that of an anode.
Figure 10:
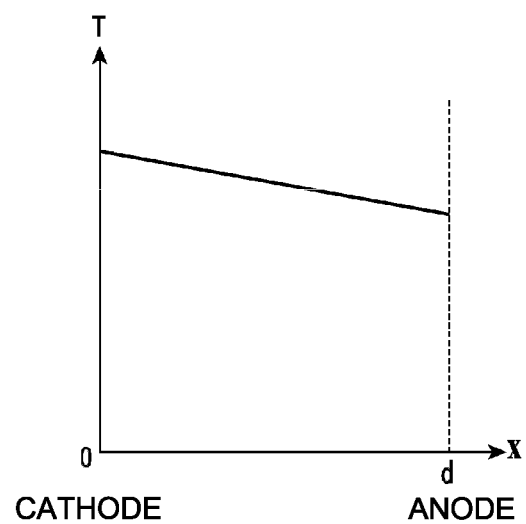

FIGS. 10(a) and 10(b) respectively show a dielectric constant ε of the KTN crystal and spatial dependence (x dependence) of a temperature T when a KTN crystal in the paraelectric phase is used as the electro-optical material 101, and the temperature of the cathode side metal block 102 is set to be higher than that of the anode side metal block 103. Providing a temperature gradient as shown in FIG. 10(b) in the KTN crystal can make the dielectric constant in the vicinity of the cathode of the KTN crystal smaller than that in the vicinity of the anode, as shown in FIG. 10(a).

Thus, the optical deflector 100 according to the first embodiment can achieve an optical deflector having an electro-optical material whose lens effect does not greatly depend on the instantaneous value of the drive voltage.

Although in the present embodiment, an example in which the cathode side metal block 102 and the anode side metal block 103 are used is shown, the material is not limited to metal and may be a conductor (a conductor hold unit) configured so as to hold the electro-optical material 101. The same applies to the following embodiment.

Second Embodiment

Figure 11:
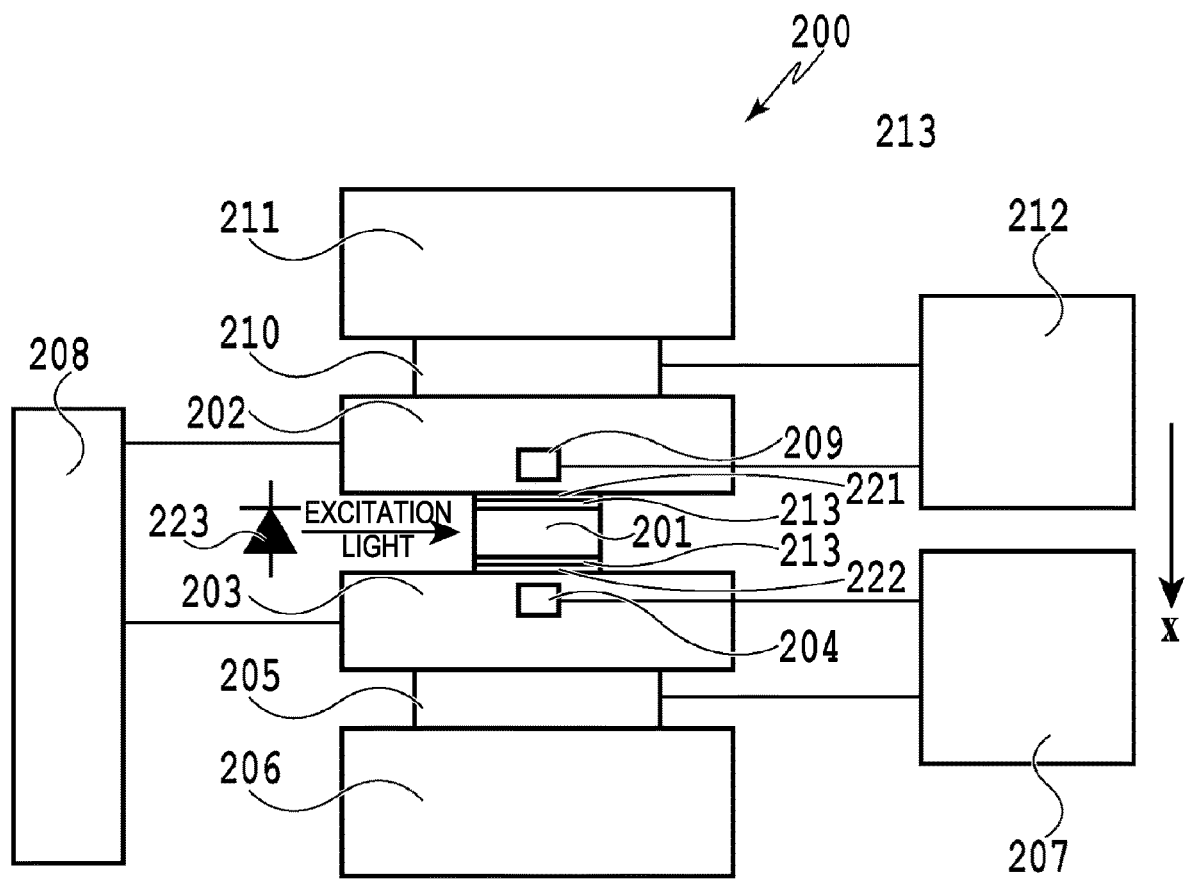
FIG. 11 is a view exemplifying a configuration of an optical deflector 200 according to the second embodiment of the present invention.

FIG. 11 shows an optical deflector 200 according to the second embodiment of the present invention, as viewed from the light incident direction.

The optical deflector 200 according to the second embodiment differs from the optical deflector 100 according to the first embodiment in the following two points. The first point is that, as shown in FIG. 11, a carbon sheet 221 is disposed between an electro-optical material 201 and a cathode side metal block 202, and that a carbon sheet 222 is disposed between the electro-optical material 201 and an anode side metal block 203. When a voltage is applied to the electro-optical material 201, the electro-optical material 201 is deformed (vibrated) due to an electrostrictive effect. The carbon sheets 221 and 222 are disposed so that the deformation (vibration) does not destroy the electro-optical material 201. This is because the carbon sheet has an appropriate elasticity and thus can absorb the deformation (vibration) of the electro-optical material 201.

The second point is that, as shown in FIG. 11, an excitation light source 223 that emits excitation light to the electro-optical material 201 is provided. When a voltage is started to be applied to the electro-optical material inside which no charges (electrons) are trapped, electron injection from the cathode into the electro-optical material 201 starts. Then, the electrons are easily captured in a trap in the electro-optical material 201 in the vicinity of the cathode. At this time, excitation light is simultaneously emitted from the excitation light source 223 to the electro-optical material 201, and thereby in the electro-optical material 201, the electrons trapped on the cathode side are excited to be relocated in a trap on the anode side. Conversely, if no excitation light is emitted, the excitation occurs only by heat, and accordingly a time required for the relocation becomes long and thus is not preferable.

The optical deflector 200 according to the second embodiment can absorb the deformation (vibration) of the electro-optical material 201 and, even when a voltage is started to be applied to the electro-optical material inside which no charges (electrons) are trapped, quickly relocate the electrons trapped on the cathode side to the trap on the anode side.

Third Embodiment

Figure 12:
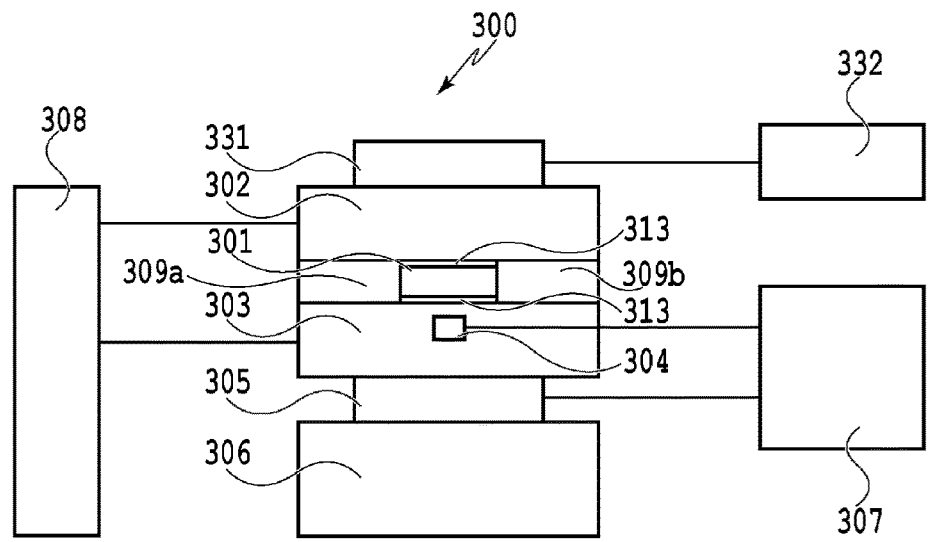
FIG. 12 is a view exemplifying a configuration of an optical deflector 300 according to the third embodiment of the present invention.

FIG. 12 shows an optical deflector 300 according to the third embodiment of the present invention, as viewed from the light incident direction.

The optical deflector 300 according to the third embodiment differs from the optical deflectors 100 and 200 according to the first and second embodiments in the following point. That is, the first and second embodiments use, as a temperature control unit, a Peltier element and a Peltier element controller connected to each of the anode side metal block and the cathode side metal block. However, if a suitable temperature gradient can be provided between the anode side metal block and the cathode side metal block, means for achieving the temperature control is not limited.

In the optical deflector 300 according to the third embodiment, as shown in FIG. 12, while an anode side metal block 303 is provided with a Peltier element 305 and a Peltier controller 307, a cathode side metal block 302 is not provided with a Peltier element and a Peltier controller but has a heater 331 attached thereto so that the heater 331 is connected to a heater drive power supply 332, configuring a temperature control unit for providing an electro-optical material 301 with a suitable temperature gradient. Furthermore, insulators 309a and 309b are provided between the cathode side metal block 302 and the anode side metal block 303 so as to surround the electro-optical material 301.

When a heat flow of the heater 331 is Q[W], a temperature of the cathode side metal block 302 is $T_h$, a temperature of the anode side metal block 303 is $T_c$, a heat resistance of the electro-optical material 301 is $R_p$, and each of heat resistances of the insulators 309a and 309b is $R_i$, Formula 9 below holds according to Ohm's law.

Expression 8

$$Q = (T_h - T_c)\left(\frac{1}{R_p} + \frac{1}{R_i}\right) \qquad \text{(Formula 9)}$$

The heat resistances $R_p$ and $R_i$ can be considered to be constant. Furthermore, the Peltier controller 307 adjusts a current to flow to the Peltier element 305 based on a measurement temperature by a temperature sensor 304, enabling to make the temperature $T_c$ of the anode side metal block 303 constant. Thus, suitably setting the heat flow Q can set the temperature $T_h$ of the cathode side metal block 302 to an optimum value.

Although in the present embodiment, the cathode side metal block 302 is configured to have the heater 331 attached thereto, the anode side metal block 303 may be configured to have the heater 331 attached thereto. Note that, in that case, the temperature of the cathode cannot be set to be higher than that of the anode. When the temperature of the electro-optical crystal is uniform, the charge density of the cathode is considered to often become larger than that of the anode; however, when the charge density of the cathode becomes smaller than that of the anode for some reason, using this configuration can make the charge density closer to uniform.

The optical deflector 300 according to the third embodiment of the present invention eliminates the need for providing both of the cathode side metal block 302 and the anode side metal block 303 with a control mechanism using a temperature sensor, a Peltier element, and a Peltier controller and uses a simple configuration in which one of the metal blocks is provided with a heater, enabling to achieve an optical deflector having a suppressed dependence of the lens effect of the electro-optical material on the instantaneous value of the drive voltage, at a lower cost.

The insulators 309a and 309b may be used also in the optical deflectors 100 and 200 according to the first and second embodiments.

Example 1

In the optical deflector 200 according to the second embodiment, as the electro-optical material 201, a KTN crystal having an electrode interval of 2 mm was used. The KTN crystal has a rectangular parallelepiped shape and a size of 4.0×3.2×2.0 mm$^3$. An electrode film made of Ti/Pt/Au was vapor-deposited on a surface of 4.0×3.2 mm$^2$. A Peltier controller 207 adjusted a current to flow to a Peltier element 205 and performed temperature control of the anode side metal block 203 so that the temperature of the anode side metal block 203 was set to 37.58° C. If the temperature of the cathode side metal block 202 was similarly set to 37.58° C., a relative dielectric constant of the KTN crystal that is the electro-optical material 201 was 17500. To provide the electro-optical material 201 with a temperature gradient, the temperature of the cathode side metal block 202 was 39.08° C. That is, the temperature of the cathode side metal block 202 was set to be 1.5° C. higher than that of the anode side metal block 203.

When a DC bias of −375 V, an amplitude of 290 V, and a sine wave voltage having a frequency of 1 kHz were applied while LED light having a peak wavelength of 405 nm was emitted, a full deflection angle of incident light having a wavelength of 1.06 μm was 22.5 mrad. A camera was disposed at a position away from a KTN crystal emission end surface at a distance of 157.5 mm to measure a beam profile 1301 at $V_{TOP}$ at which the instantaneous value of the voltage itself is maximum, a beam profile 1302 at a voltage $V_{BOTTOM}$ at which the absolute value of the instantaneous value of the voltage is maximum, and a beam profile 1303 at an intermediate voltage $V_{DC}$.

Figure 13:
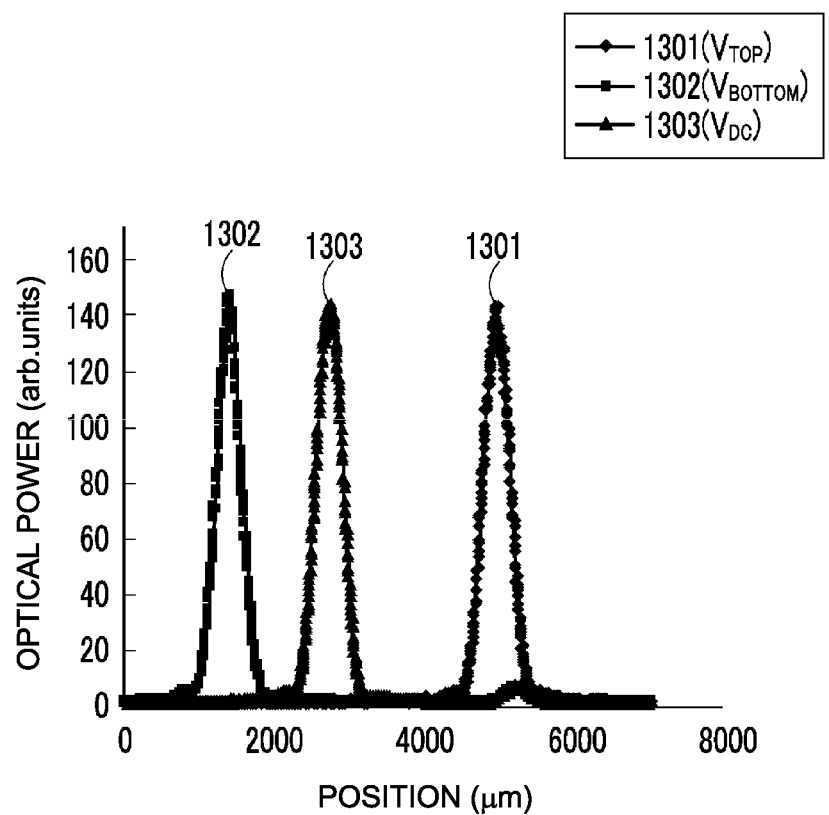
FIG. 13 is a view showing an evaluation result of position dependence of light intensity in the deflection direction in an optical deflector according to Example 1 of the present invention.

FIG. 13 shows an evaluation result of position dependence of light intensity in the deflection direction in the optical deflector according to Example 1. As shown in FIG. 13, the beam diameter (radius) was 362 μm at $V_{TOP}$, 340 μm at $V_{BOTTOM}$, and 351 μm at $V_{DC}$, and the variation in the beam diameter was within about 6%. Accordingly, it can be confirmed that dependence of the beam diameter on the instantaneous value of the drive voltage can be suppressed.

Figure 14:
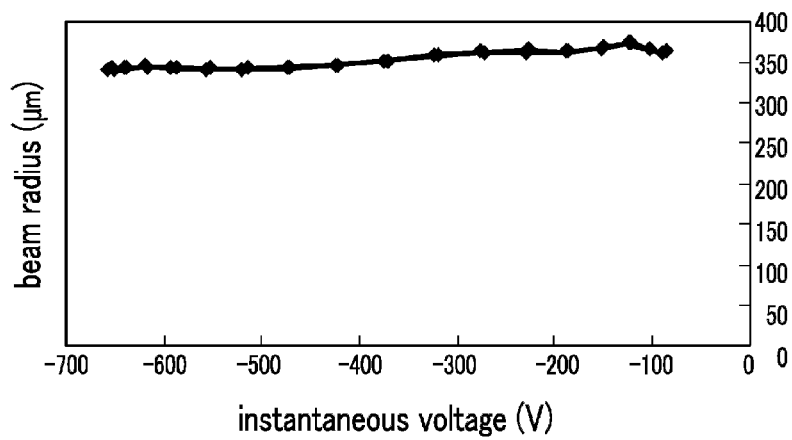
FIG. 14 is a view showing an evaluation result of a beam diameter (radius) at an instantaneous value when a phase of a drive voltage applied to the optical deflector according to Example 1 is changed by 10°.

In the optical deflector according to Example 1, to more specifically examine the dependence of the beam diameter on the instantaneous value of the drive voltage, the instantaneous value of the drive voltage other than $V_{TOP}$, $V_{BOTTOM}$, and $V_{DC}$ is evaluated. Then, the beam diameter at the instantaneous value when the phase of the drive voltage is changed by 10° is evaluated. The result is shown in FIG. 14. As shown in FIG. 14, the beam diameter is 374.4 μm at maximum, 339.6 μm at minimum, and 340.0 μm at average, and the variation evaluated by (maximum−minimum)/average is within 9.8%. Accordingly, it can be confirmed that even when the phase of the drive voltage is changed by 10° C. and the beam diameter is evaluated, the variation in the beam diameter can be suppressed.

Example 2

In the optical deflector 200 according to the second embodiment, as the electro-optical material 201, a KTN crystal having an electrode interval of 1.2 mm was used. The KTN crystal has a rectangular parallelepiped shape and a size of 4.0×3.2×1.2 mm$^3$. An electrode film made of Ti/Pt/Au was vapor-deposited on a surface of 4.0×3.2 mm$^2$. The Peltier controller 207 adjusted a current to flow to the Peltier element 205 and performed temperature control of the anode side metal block 203 so that the temperature of the anode side metal block 203 was set to 40.28° C. If the temperature of the cathode side metal block 202 was similarly set to 40.28° C., a relative dielectric constant of the KTN crystal that is the electro-optical material 201 was 15400. To provide the electro-optical material 201 with a temperature gradient, the temperature of the cathode side metal block 202 was 40.78° C. That is, the temperature of the cathode side metal block 202 was set to be 0.5° C. higher than that of the anode side metal block 203.

When a DC bias of −280 V, an amplitude of 290 V, and a sine wave voltage having a frequency of 5 kHz were applied while LED light having a peak wavelength of 405 nm was emitted, a full deflection angle of incident light having a wavelength of 1.06 μm was 39 mrad. A camera was disposed at a position away from the KTN crystal emission end surface at a distance of 137.5 mm to measure beam profiles at a voltage $V_{BOTTOM}$ at which the absolute value of the instantaneous value of the voltage is maximum, at $V_{TOP}$ at which the instantaneous value of the voltage itself is maximum, and at an intermediate voltage $V_{DC}$, and a beam profile in the deflection direction is analyzed. As a result, the beam diameter (radius) was 426 μm at $V_{TOP}$, 431 μm at $V_{BOTTOM}$, and 404 μm at $V_{DC}$, and the variation in the beam diameter was within about 6%.

REFERENCE SIGNS LIST

11 KTN crystal
12a, 12b Aluminum nitride (AlN)
13a, 13b Metal block
14a, 14b Graphite sheet
15 Support plate
16, 105, 110, 205, 210, 305 Peltier element
17a, 17b Thermistor (temperature detector)
18 Temperature control device
19, 113, 213, 313 Electrode pair
100, 200, 300 Optical deflector
101, 201, 301 Electro-optical material
102, 202, 302 Cathode side metal block
103, 203, 303 Anode side metal block
104, 109, 204, 209, 304 Temperature sensor
106, 111, 206, 211, 306 Heat sink
107, 112, 207, 212, 307 Peltier controller
108, 208, 308 Power supply
221, 222 Carbon sheet
223 Excitation light source
309a, 309b Insulator
331 Heater
332 Heater drive power supply

The invention claimed is:

1. An optical deflector comprising:
an electro-optical material in a paraelectric phase and having a trap for accumulating charges inside the electro-optical material;
an electrode pair formed on surfaces of the electro-optical material facing each other, the electrode pair comprising a cathode and an anode configured to generate an electric field inside the electro-optical material;
a first conductor hold unit and a second conductor hold unit provided so as to hold the electro-optical material and the electrode pair therebetween;
a temperature sensor configured to measure at least one of temperatures of the first conductor hold unit and the second conductor hold unit; and a temperature control unit configured to control each of the temperatures of the first conductor hold unit and the second conductor hold unit, based on the temperature measured in the temperature sensor, the optical deflector being configured to set an optical axis of incident light into the electro-optical material so as to be orthogonal to a direction of the electric field, apply between the electrode pair an alternating current voltage on which a direct current bias voltage is superimposed, and thereby deflect the incident light, wherein the temperature control unit is configured to control the temperatures of the first conductor hold unit and the second conductor hold unit so as to give the electro-optical material a temperature gradient to make a charge density in the electro-optical material substantially uniform.

2. The optical deflector according to claim 1, further comprising an excitation light source configured to emit excitation light to the electro-optical material.

3. The optical deflector according to claim 2, wherein the electro-optical material is a KTN ($KTa_{1-x}Nb_xO_3$) crystal or a lithium-added KLTN ($K_{1-y}Li_yTa_{1-x}Nb_xO_3$) crystal, where $0<x<1$ and $0<y<1$.

4. The optical deflector according to claim 2, wherein a carbon sheet is disposed individually between the electro-optical material and the first conductor hold unit and between the electro-optical material and the second conductor hold unit.

5. The optical deflector according to claim 2, wherein the temperature sensor comprises: a first temperature sensor configured to measure a temperature of the first conductor hold unit; and a second temperature sensor configured to measure a temperature of the second conductor hold unit, and the temperature control unit comprises: a first Peltier element attached to the first conductor hold unit; a first Peltier controller configured to adjust a current to flow to the first Peltier element, based on the temperature measured in the first temperature sensor; a second Peltier element attached to the second conductor hold unit; and a second Peltier controller configured to adjust a current to flow to the second Peltier element, based on the temperature measured in the second temperature sensor.

6. The optical deflector according to claim 2, wherein the temperature sensor is configured to measure a temperature of the first conductor hold unit, and the temperature control unit comprises: a Peltier element provided in the first conductor hold unit; a Peltier controller configured to adjust a current to flow to the Peltier element, based on the temperature measured in the temperature sensor; and a heater attached to the second conductor hold unit.

7. The optical deflector according to claim 1, wherein the electro-optical material is a KTN ($KTa_{1-x}Nb_xO_3$) crystal or a lithium-added KLTN ($K_{1-y}Li_yTa_{1-x}Nb_xO_3$) crystal, where $0<x<1$ and $0<y<1$.

8. The optical deflector according to claim 7, wherein a carbon sheet is disposed individually between the electro-optical material and the first conductor hold unit and between the electro-optical material and the second conductor hold unit.

9. The optical deflector according to claim 7, wherein the temperature sensor comprises: a first temperature sensor configured to measure a temperature of the first conductor hold unit; and a second temperature sensor configured to measure a temperature of the second conductor hold unit, and the temperature control unit comprises: a first Peltier element attached to the first conductor hold unit; a first Peltier controller configured to adjust a current to flow to the first Peltier element, based on the temperature measured in the first temperature sensor; a second Peltier element attached to the second conductor hold unit; and a second Peltier controller configured to adjust a current to flow to the second Peltier element, based on the temperature measured in the second temperature sensor.

10. The optical deflector according to claim 7, wherein the temperature sensor is configured to measure a temperature of the first conductor hold unit, and the temperature control unit comprises: a Peltier element provided in the first conductor hold unit; a Peltier controller configured to adjust a current to flow to the Peltier element, based on the temperature measured in the temperature sensor; and a heater attached to the second conductor hold unit.

11. The optical deflector according to claim 1, wherein a carbon sheet is disposed individually between the electro-optical material and the first conductor hold unit and between the electro-optical material and the second conductor hold unit.

12. The optical deflector according to claim 11, wherein the temperature sensor comprises: a first temperature sensor configured to measure a temperature of the first conductor hold unit; and a second temperature sensor configured to measure a temperature of the second conductor hold unit, and the temperature control unit comprises: a first Peltier element attached to the first conductor hold unit; a first Peltier controller configured to adjust a current to flow to the first Peltier element, based on the temperature measured in the first temperature sensor; a second Peltier element attached to the second conductor hold unit; and a second Peltier controller configured to adjust a current to flow to the second Peltier element, based on the temperature measured in the second temperature sensor.

13. The optical deflector according to claim 11, wherein the temperature sensor is configured to measure a temperature of the first conductor hold unit, and the temperature control unit comprises: a Peltier element provided in the first conductor hold unit; a Peltier controller configured to adjust a current to flow to the Peltier element, based on the temperature measured in the temperature sensor; and a heater attached to the second conductor hold unit.

14. The optical deflector according to claim 1, wherein the temperature sensor comprises: a first temperature sensor configured to measure a temperature of the first conductor hold unit; and a second temperature sensor configured to measure a temperature of the second conductor hold unit, and the temperature control unit comprises: a first Peltier element attached to the first conductor hold unit; a first Peltier controller configured to adjust a current to flow to the first Peltier element, based on the temperature measured in the first temperature sensor; a second Peltier element attached to the second conductor hold unit; and a second Peltier controller configured to adjust a current to flow to the second Peltier element, based on the temperature measured in the second temperature sensor.

15. The optical deflector according to claim 1, wherein the temperature sensor is configured to measure a temperature of the first conductor hold unit, and
the temperature control unit comprises: a Peltier element provided in the first conductor hold unit; a Peltier controller configured to adjust a current to flow to the Peltier element, based on the temperature measured in the temperature sensor; and a heater attached to the second conductor hold unit.

* * * * *